(12) United States Patent
Walter et al.

(10) Patent No.: US 9,141,363 B2
(45) Date of Patent: Sep. 22, 2015

(54) APPLICATION CONSTRUCTION FOR EXECUTION ON DIVERSE COMPUTING INFRASTRUCTURES

(75) Inventors: Thomas Walter, Althengstett (DE); Petio Petev, Sofia (BG)

(73) Assignee: SAP SE, Walldorf (DE)

( * ) Notice: Subject to any disclaimer, the term of this patent is extended or adjusted under 35 U.S.C. 154(b) by 537 days.

(21) Appl. No.: 13/429,244

(22) Filed: Mar. 23, 2012

(65) Prior Publication Data

US 2013/0254758 A1 Sep. 26, 2013

(51) Int. Cl.
*G06F 9/44* (2006.01)
*G06F 9/445* (2006.01)

(52) U.S. Cl.
CPC .... *G06F 8/61* (2013.01); *G06F 8/60* (2013.01)

(58) Field of Classification Search
CPC ........... G06F 8/61; G06F 8/60; G06F 9/5022; G06F 9/5066
See application file for complete search history.

(56) References Cited

U.S. PATENT DOCUMENTS

| | | | | |
|---|---|---|---|---|
| 7,243,306 | B1 * | 7/2007 | Joshi et al. | 715/735 |
| 8,037,471 | B2 * | 10/2011 | Keller et al. | 717/174 |
| 2004/0098706 | A1 * | 5/2004 | Khan et al. | 717/120 |
| 2006/0080336 | A1 * | 4/2006 | Zhang et al. | 707/100 |
| 2006/0165105 | A1 * | 7/2006 | Shenfield et al. | 370/401 |
| 2007/0143379 | A1 * | 6/2007 | i Dalfo et al. | 707/205 |
| 2009/0276771 | A1 * | 11/2009 | Nickolov et al. | 717/177 |
| 2011/0296370 | A1 * | 12/2011 | Ferris et al. | 717/100 |
| 2012/0054731 | A1 * | 3/2012 | Aravamudan et al. | 717/170 |
| 2012/0185821 | A1 * | 7/2012 | Yaseen et al. | 717/105 |
| 2012/0266168 | A1 * | 10/2012 | Spivak et al. | 718/1 |
| 2013/0212576 | A1 * | 8/2013 | Huang et al. | 718/1 |

OTHER PUBLICATIONS

Dejun Jiang et al.; Autonomous resource provisioning for multi-service web applications; 2010 ACM; pp. 471-480; <http://dl.acm.org/citation.cfm?id=1772739>.*

Qi Zhang et al.; A Regression-Based Analytic Model for Dynamic Resource Provisioning of Multi-Tier Applications; 2007 IEEE; 10 pages; <http://ieeexplore.ieee.org/stamp/stamp.jsp?tp=&arnumber=4273121>.*

Hadi Goudarzi et al.; Multi-dimensional SLA-based Resource Allocation for Multi-tier Cloud Computing Systems; 2011 IEEE; pp. 324-331; <http://ieeexplore.ieee.org/stamp/stamp.jsp?tp=&arnumber=6008726>.*

(Continued)

*Primary Examiner* — Thuy Dao
*Assistant Examiner* — Cuong V Luu
(74) *Attorney, Agent, or Firm* — Schwegman Lundberg & Woessner, P.A.

(57) ABSTRACT

Example systems and methods of application construction for execution on diverse computing infrastructures are presented. In one example, an application descriptor comprising information regarding an application is received. Available computing machine resources for execution of the application are selected based on the information in the application descriptor. Software resources comprising the application are installed on the selected computing machine resources based on the information in the application descriptor. At least one of the selected computing machine resources and the installed software resources are configured for execution of the application based on the information in the application descriptor.

14 Claims, 7 Drawing Sheets

(56) References Cited

OTHER PUBLICATIONS

Waheed Iqbal et al.; Adaptive resource provisioning for read intensive multi-tier applications in the cloud; 2011 Elsevier; pp. 871-879; <http://www.sciencedirect.com/science/article/pii/S0167739X10002098#>.*

Bhuvan Urgaonkar et al.; Dynamic Provisioning of Multi-tier Internet Applications; 2005 ICAC; 12 pages; <http://ieeexplore.ieee.org/stamp/stamp.jsp?tp=&arnumber=1498066>.*

A. Terzis et al.; A Two-Tier Resource Management Model for the Internet; 1999 Globecom; pp. 1779-1791; <http://ieeexplore.ieee.org/stamp/stamp.jsp?tp=&arnumber=832469>.*

"Cloud computing", [online]. 2012, Wikipedia®. [retrieved on Mar. 9, 2012]. Retrieved from the Internet: <URL: http://en.wikipedia.org/w/index.php?title=Cloud_computing&printable=yes>, (2012), 10 pgs.

"JSON", [online]. 2012, Wikipedia®. [retrieved on Mar. 11, 2012]. Retrieved from the Internet: <URLhttp://en.wikipedia.org/w/index.php?title=JSON&printable=yes>, (2012), 11 pgs.

\* cited by examiner

APPLICATION CONSTRUCTION FOR EXECUTION ON DIVERSE COMPUTING INFRASTRUCTURES

BACKGROUND

Several types of cloud-computing solutions have been developed to address the needs of multiple customer segments. One type of solution is Software-as-a-Service (SaaS), in which a cloud-computing service provider provides one or more software applications and the various hardware and software computing resources to execute those applications at the request of a customer. Such a solution frees the customer from the procurement and maintenance of the hardware and software used to execute applications of interest, as well as the upkeep of the applications themselves.

Another type of solution is Platform-as-a-Service (PaaS), to which the customer publishes or otherwise provides the application to be executed to the hardware and software platform supplied by the service provider. In many instances, the hardware and software platform provided may also include a development environment in which the customer may develop and test the application to be executed. Thus, in PaaS offerings, the customer is responsible for more of the execution environment than in the SaaS environment in exchange for greater control over the application.

Representing another level of cloud-computing solution is Infrastructure-as-a-Service (IaaS), in which the service provider offers computing resources in the form of physical or virtual machines, data storage, networks, load balancers, and the like. In some examples, the customer provides any applications to be executed, possibly along with operating system images and other portions of the execution runtime environment for executing the applications. Generally, access to an IaaS is facilitated by way of an application programming interface (API). Typically, IaaS APIs are not standardized, and thus tend to vary from service provider to service provider. As a result, in order to adapt applications to execute on multiple IaaS offerings, the applications may require manual changes to the application to port the applications to each IaaS offering of interest.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

At least some of the embodiments described herein provide various techniques for constructing an application for execution on a computing infrastructure. In one example, the computing infrastructure is provided via an infrastructure-as-a-service (IaaS). Generally, the application is modeled by way of an application descriptor that provides information regarding hardware and software resources to be employed in the computing infrastructure to execute the application, as well as instructions and/or rules for controlling the execution of the application. To facilitate execution of the application, a constructing infrastructure associated with the computing infrastructure assembles and configures the necessary resources of the computing infrastructure according to the application descriptor. Thus, any computing infrastructure employing a constructing infrastructure capable of understanding the application descriptor may execute the application without changes to either the application descriptor or the application itself. Other aspects of the embodiments discussed herein may be ascertained from the following detailed description.

Figure 1:
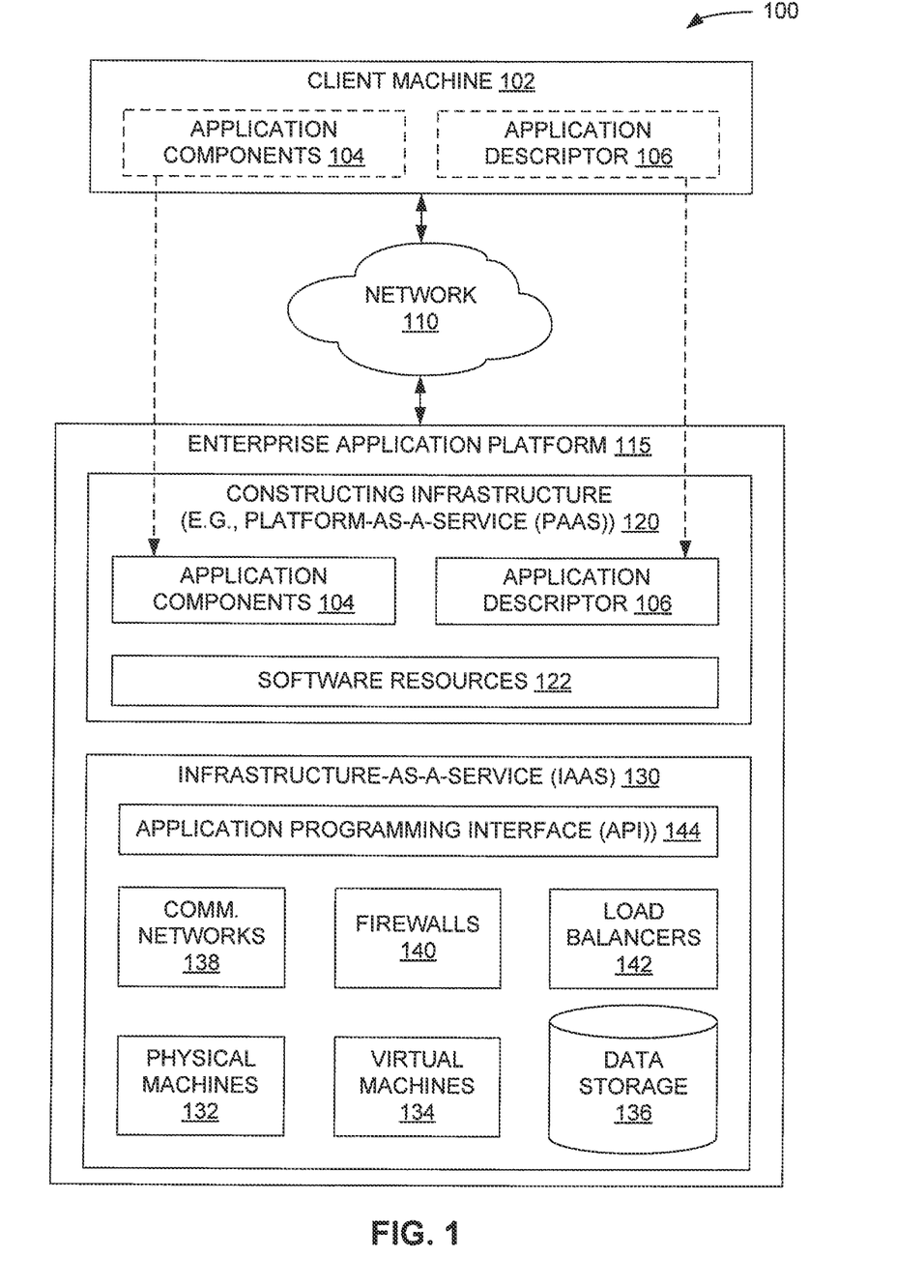
FIG. 1 is a block diagram of an example system having a client-server architecture, with the system having an enterprise application platform including a constructing infrastructure capable of employing the systems and methods described herein.

FIG. 1 is a block diagram of an example system 100 having a client-server architecture for an enterprise application platform 115 capable of employing the systems and methods described herein. A platform machines and software) in the exemplary form of the enterprise application platform 115 provides server-side functionality via a network 110 (e.g., the Internet or another wide-area network (WAN)) to one or more client machines 102. In one example, the client machine 102 may be a machine with a web client (e.g., a browser, such as the Internet Explorer® browser developed by Microsoft Corporation), a small device client machine with a small device web client (e.g., a browser without a script engine), or a client/server machine with a programmatic client.

As depicted in FIG. 1, the enterprise application platform 115 includes an infrastructure-as-a-service (IaaS) 130 and a constructing infrastructure 120. In one example, the constructing infrastructure 120 appears as a platform-as-a-service (PaaS) residing atop of, and working in conjunction with, the IaaS 130. The IaaS 130 provides an application programming interface (API) 144 that facilitates use of the IaaS 130 by the constructing infrastructure 120. Further, the IaaS 130 may include one or more physical machines 132, virtual machines 134, data storage 136, communication networks 138, firewalls 140, and load balancers 142. The physical machines 132 may be any type of computing machines or systems capable of executing a portion of an application. The virtual machines 134 may be any type of virtual machine used to execute one or more types of applications. One type of virtual machine may be a Java® Virtual Machine (JVM) capable of running on a physical machine to execute a Java® application. Depending on the particular implementation, the IaaS 130 may make available to a user via the API 144 one or more of the physical machines 132, the virtual machines 134, or both.

The physical machines 132 and/or the virtual machines 134 may also have access to data storage 136. In one example, the data storage 136 may be block data storage in the form of one or more hard disk drives, optical disk drives, solid state disk (SSD) drives, or other non-volatile memory devices. The data storage 136 may be used to store input or output data for an application being executed on the one or more physical machines 132 and/or virtual machines 134. In one example, the data storage 136 may contain a database employed by the physical machines 132 and/or virtual machines 134 to service database queries.

Continuing with the IaaS 130, the communication networks 138 may facilitate communication between any of the physical machines 132, the virtual machines 134, or other devices or systems external to the IaaS 130. The firewalls 140 may provide protection for the various devices or systems of the IaaS 130 from security threats originating outside the IaaS 130. The load balancers 142 may instantiate and control the amount of resources, such as the number of physical machines 132 or virtual machines 134, being employed for a particular application, as well as control the workload of each of the resources.

Depending on the particular IaaS 130, different types and amounts of resources may be available to a user. For example, one IaaS 130 may provide only virtual machines 134 to a user, another IaaS 130 may supply only physical machines 132, and a third IaaS 130 may facilitate the use of both by a user or client directly. Also, some IaaS 130 offerings may employ fewer resources than those depicted in FIG. 1, while others may provide more resources than those shown therein.

Currently, several IaaS 130 offerings may be available to a user at any particular time for executing a particular application of interest to the user. In many instances, one IaaS 130 may employ a different API 144 than another, especially if the IaaS 130 systems are provided by different suppliers. Further, any particular IaaS 130 may evolve over time, along with its API 144. Since the application may employ the API 144 to perform various functions associated with the application, differences between various possible APIs 144, or changes to a particular API 144, may cause corresponding modifications in the application to allow the application to be executed on a particular IaaS 130. Given the time and expense likely involved to make such modifications, a user may be influenced to restrict execution of the application to only those IaaS 130 offerings having APIs 144 which are compatible with the current version of the application.

To facilitate execution of an application to a wider range of IaaS 130 offerings, the constructing infrastructure 120 of FIG. 1 may be employed atop the IaaS 130. Generally, the constructing infrastructure 120 provides a number of software resources 122 that facilitate execution of the application on the IaaS 130. These software resources 122 may include, but are not limited to, an operating system, middleware for supporting the application (e.g., a database and/or other binary files native to the operating system), software frameworks for executing the application (e.g., Java® application servers for Java® applications), web services, and the like. In some examples, the software resources 122 may include one or more development tools, such as an integrated development environment (IDE) for developing and testing the application, an example of which is the Eclipse® environment often used by developers for Java® applications. Accordingly, in one example, the constructing infrastructure 120 may operate as a platform-as-a-service (PaaS) from the viewpoint of a user. While the various software resources 122 are depicted within the constructing infrastructure 120 in FIG. 1, one or more of the software resources 122 may be provided external to the constructing infrastructure 120 in other implementations.

To facilitate execution of the application on the IaaS 130, the constructing infrastructure 120 receives the application, oftentimes organized as multiple application components 104, along with an application descriptor 106. Generally, the application descriptor 106 includes information describing the hardware and software resources to be employed in the IaaS 130 to execute the application, as well as any runtime rules or policies to be implemented during execution of the application. The constructing infrastructure 120 may then use the information in the application descriptor 106 to select the appropriate hardware resources 132-142, install the application components 104 of the application and associated software resources thereon, and execute the application according to the runtime rules or policies specified.

As illustrated in FIG. 1, the application components 104 and the application descriptor 106 may be transmitted to the constructing infrastructure 120 of the enterprise application platform 115 from a client machine 102 via the network 110. In other implementations, machines, devices, or systems other than the client machine 102 may provide either or both of the application components 104 and the application descriptor 106 to the constructing infrastructure. For example, the application descriptor 106 may describe locations at which the constructing infrastructure 120 may retrieve one or more of the application components 104, such as at a data storage system external to the enterprise application platform 115. Further, devices other than the client machine 102 may access the executing application on the IaaS 130 in other examples.

Figure 2:
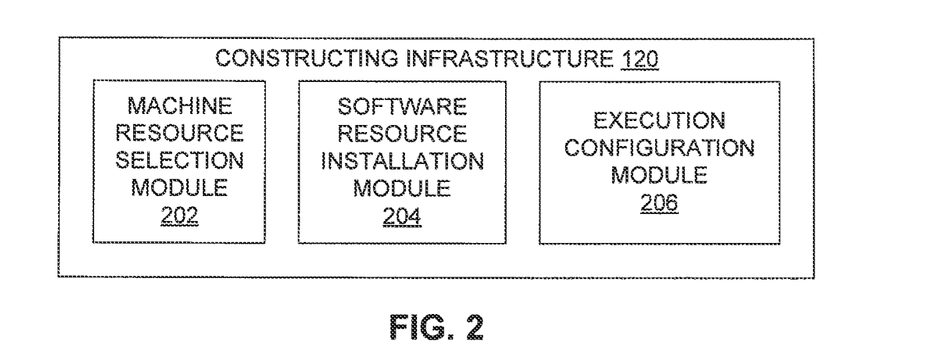
FIG. 2 is a block diagram of example modules employed in the constructing infrastructure of FIG. 1.

FIG. 2 is a block diagram of example modules employed in the constructing infrastructure 120 of FIG. 1. The modules may include a machine resource selection module 202, a software resource installation module 204, and an execution configuration module 206. The machine resource selection module 202 may select from or specify available computing machine resources from the IaaS 130 (FIG. 1) (e.g. physical machines 132 or virtual machines 134, data storage 136, and so on) to be used in executing the application components 104. The software resource installation module 204 may install various software resources 122 and application components 104 onto one or more of the various machine resources provided by the IaaS 130. The execution configuration module 206 may configure the selected machine resources and/or the installed software resources to enable execution of the application of interest according to predetermined rules or policies. Each of these modules 202-206 may perform its corresponding functions according to the information provided in the application descriptor 106.

Any of the modules 202-206 may be combined into fewer modules or may be partitioned into a greater number of modules. In addition, while the embodiments discussed herein presume the use of the client-server architecture of the system 100 of FIG. 1, the techniques presented may be employed in a peer-to-peer arrangement, or even within a single computing system.

Figure 3:
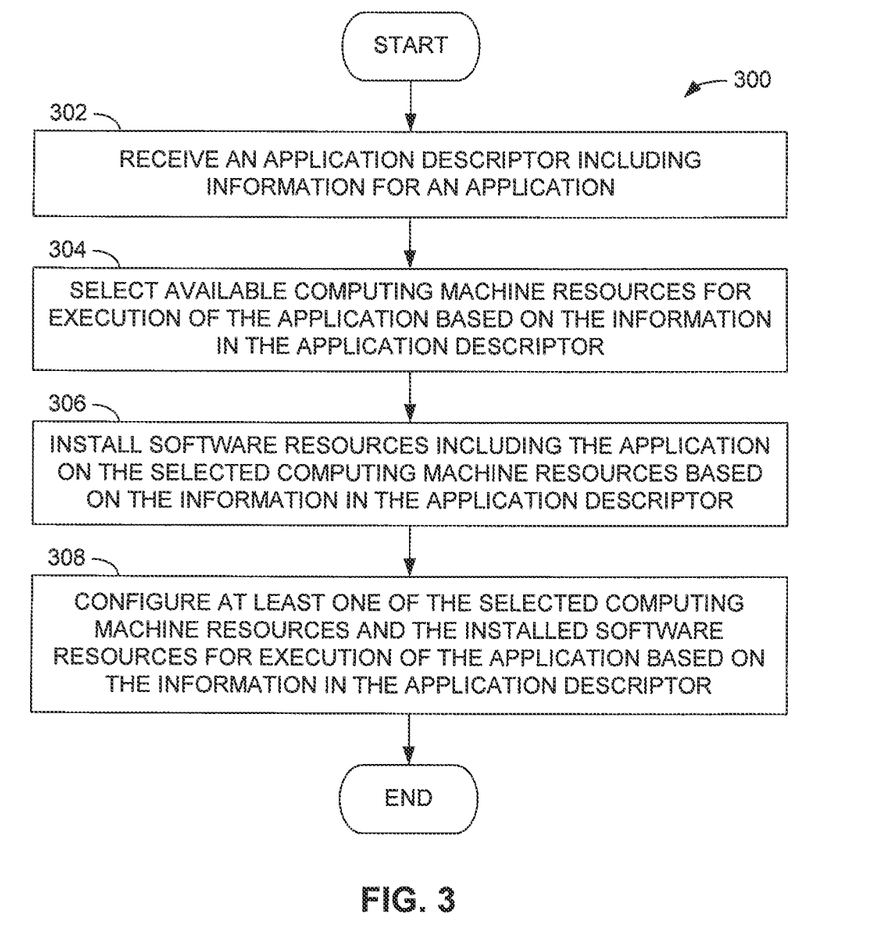
FIG. 3 is a flow diagram of an example method of application construction for execution on a computing infrastructure.

FIG. 3 is a flow diagram of an example method 300 of application construction for execution on a computing infrastructure, such as the IaaS 130 of FIG. 1. In an example, the method 300 may be performed by the constructing infrastructure 120 (FIGS. 1 and 2). In the method 300, the constructing infrastructure 120 may receive an application descriptor 106 including information for an application to be executed (operation 302). Based on the information, the constructing infrastructure 120 may select computing machine resources available in the IaaS 130 (FIG. 1) for execution of the application (operation 304). After at least some of the machine resources have been selected, the constructing infrastructure 120 may install one or more software resources 122 (FIG. 1), including components 104 (also FIG. 1) of the application, on the selected computing machine resources based on the application descriptor 106 information (operation 306). Also based on the information in the application descriptor 106, the constructing infrastructure 120 may configure the computing machine resources and/or the installed software resources for executing the application (operation 308).

While the operations 302 through 308 of the method 300 of FIG. 3 are shown in a specific order, other orders of operation, including possibly concurrent execution of at least portions of one or more operations, may be possible in some implementations of method 300, as well as other methods discussed herein.

Figure 4:
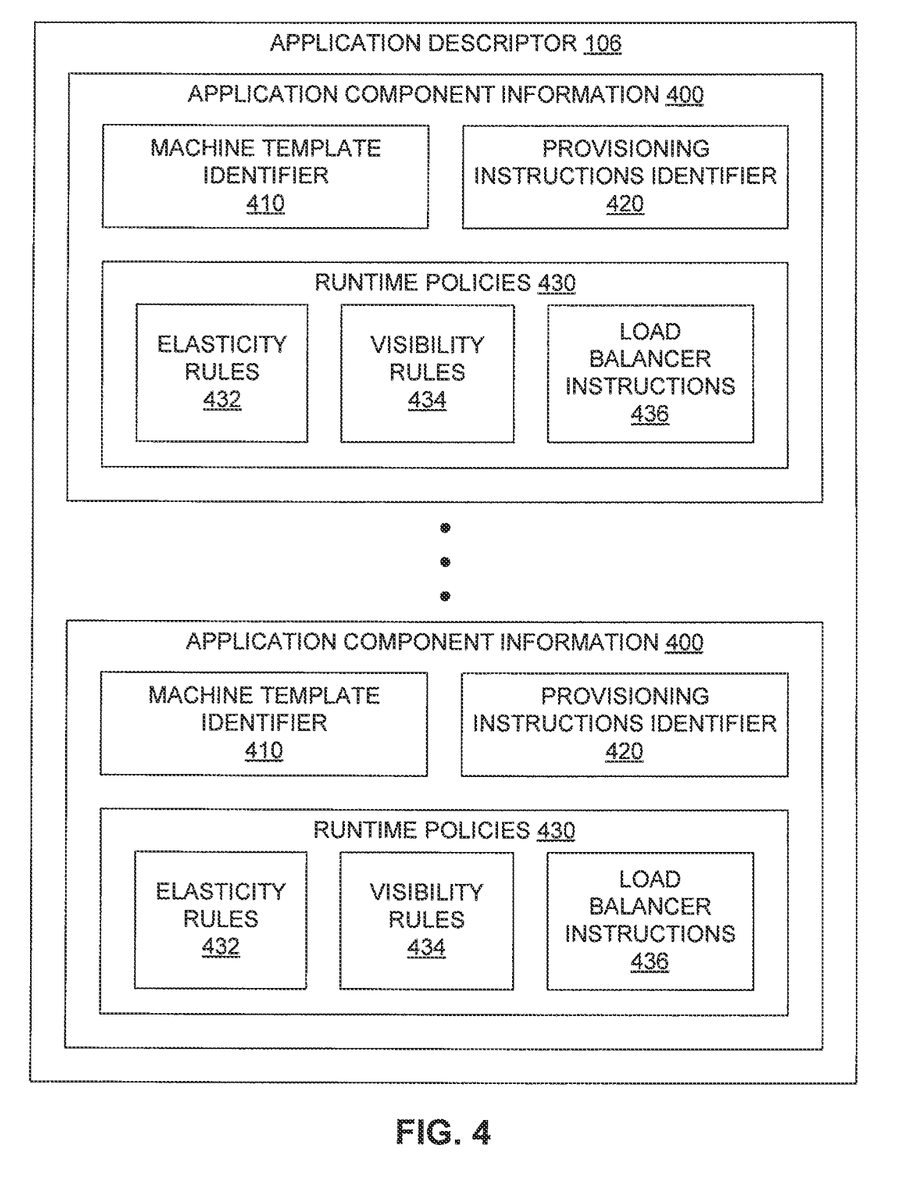
FIG. 4 is a block diagram of an example application descriptor for construction of an application for execution on a computing infrastructure.

FIG. 4 is a block diagram of an example application descriptor 106 (FIG. 1) for construction of an application for execution on a computing infrastructure, such as the IaaS 130 (FIG. 1). In some implementations, the application descriptor 106 may be expressed as one or more data objects in JavaScript Object Notation (BON). In this particular example, each application component 104 (FIG. 1) of the application of interest may be represented by its own separate application component information 400. In other examples, the information for one or more application components may be grouped together in a single data structure.

Each section of application component information 400 may include one or more of a machine template identifier 410, provisioning instructions identifier 420, and runtime policies 430. In an example, the machine template identifier 410 may be a name or other identifier of a machine template that specifies various aspects of the computing machine resources that will be used for the associated application component 104. Such resources may include, but are not limited to, the operating system to be used, the type and number of processor cores to be employed, the amount of main memory to be provided, the amount of disk drive capacity to be made available, and so on. In one implementation, the machine template identifier 410 may reference a particular machine template maintained by the IaaS 130. In that case, the constructing infrastructure 120 may only pass the machine template identifier 410 to the IaaS 130, which in turn selects the various resources available in the IaaS 130 for executing the application. In other examples, the constructing infrastructure 120 may access the machine template referenced by the machine template identifier 410 and instruct the IaaS 130 via the API 144 (FIG. 1) as to the particular computing machine resources desired. Under this scenario, the constructing infrastructure 120 may store one or more machine templates locally, or access machine templates that are stored in the IaaS 130 or elsewhere. In yet another example, the application component information 400 may store the machine template within the application component information 400.

Each section of application component information 400 may also include a provisioning instructions identifier 420 for identifying one or more provisioning instructions that in turn identify one or more software resources (e.g., the software resource 122 of FIG. 1) that are to be installed in the computing machine resources identified via the machine template identifier 410. Examples of the software resources may include virtual machines, one or more additional modules deployed in the virtual machines, applications servers, binary content, and the like. In the particular example of a Java® application, the software resources may include one or more Java® Virtual Machines (JVMs), other Java® modules deployed in the JVMs, Java® application servers, and so forth. In one implementation, the constructing infrastructure 120 may execute the provisioning instructions after the computing machine resources associated with the current application component 104 have been instantiated or selected for the application component 104. The provisioning instructions may also specify the installation of the associated application component 104. In one implementation, the constructing infrastructure 120 may use the provisioning instructions identifier 420 to access the provisioning instructions, which may be stored either within the constructing infrastructure 120 or elsewhere, and execute the instructions to install the software resources. In yet another sample, the application component information 400 may store the provisioning instructions within the application component information 400.

Additionally, the application component information 400 for each application component 104 may include information for one or more runtime policies 430 for the associated application component 104 during execution. As shown in FIG. 4, the runtime policies 430 applicable to the associated application component 104 may include elasticity rules 432, visibility rules 434, and load balancer instructions 436. In some implementations, the application component information 400 for any particular application component 104 need not include each of the elasticity rules 432, the visibility rules 434, and the load balancer instructions 436, but may instead omit one or more of these types of runtime policies 430.

In one example, the elasticity rules 432 may define how many instances or "machines" of the associated application component 104 may be instantiated in response to one or more prevailing conditions, such as the workload expected or experienced by each instance of the application component 104, the response time desired for each instance of the application component 104, the current time of day, and the current day of week. The elasticity rules 432 may also specify a minimum and a maximum number of instances that may apply during the lifetime of the application execution, or for certain times or days. Other rules regarding the number of instances of the application component 104 may also be specified as elasticity rules 432.

For each application component 104, the visibility rules 434 of the runtime policies 430 for that component 104 may specify application components 104 of the application that maintain visibility of the application component 104 governed by the visibility rules 434. In some embodiments, the visibility rules 434 may specify certain entry points or uniform resource locators (URLs) of the associated application component 104 that are visible to the other application components 104. In an example illustrated in FIG. 6, described below, the visibility rules 434 may be employed to model a plurality of tiers for the application. The ability to specify application tiers in such a manner may facilitate the modeling of complex applications in the application descriptor 106.

The load balancer instructions 436 for an application component 104 may provide instructions to register an entry point or URL of an associated application component 104 with a load balancer 142 of the IaaS 130 (FIG. 1). In an example, execution of the instructions leads to exposure of the entry point or URL to users so that the users may access the application component 104 by way of an Internet browser (e.g., Internet Explorer® by Microsoft Corporation) or other client. The load balancer instructions 436 may also include other instructions or rules that further specify the operation of the load balancer 142 with respect to the application component 104.

Figure 5:
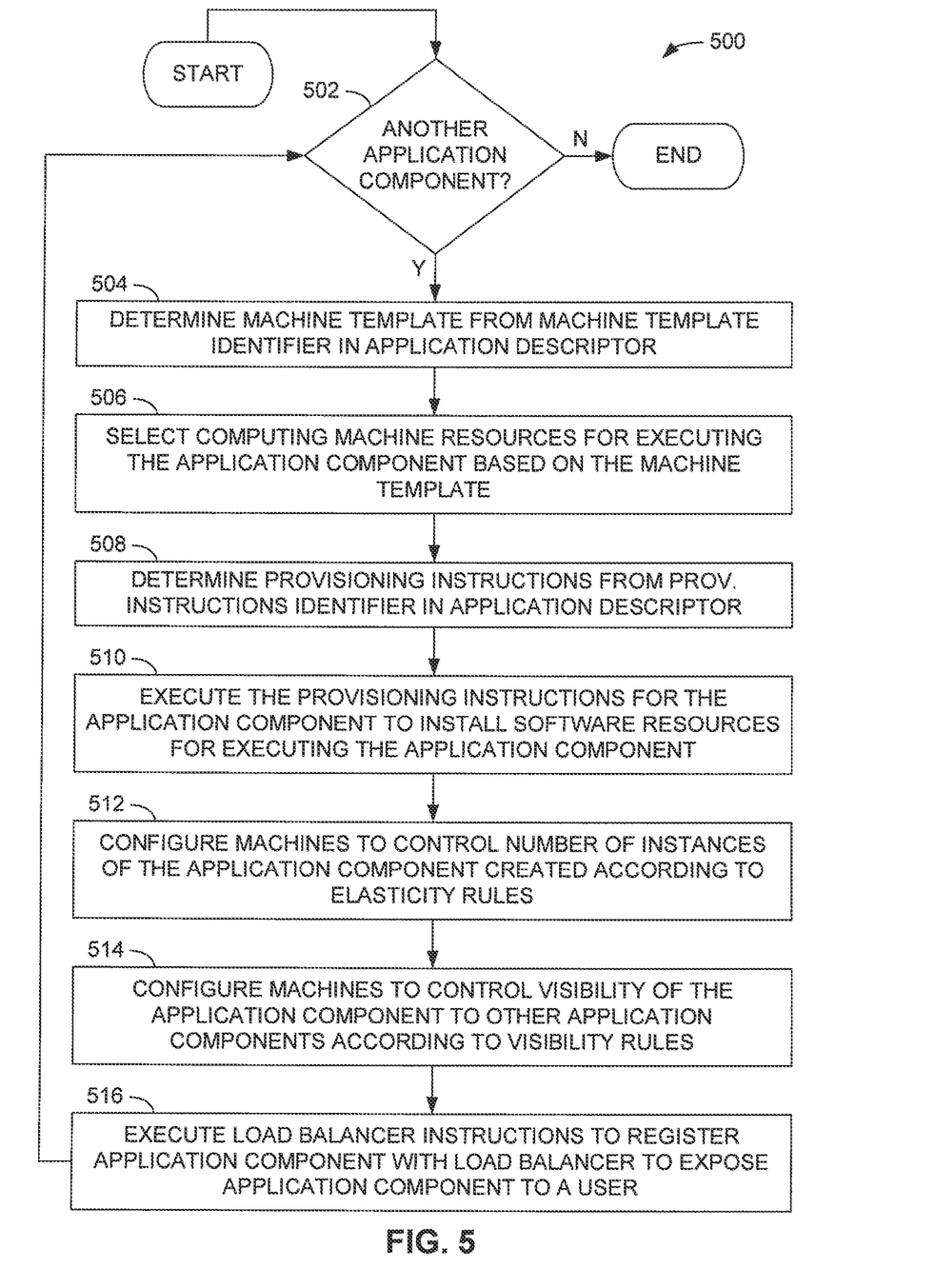
FIG. 5 is a flow diagram of an example method of constructing multiple components of an application for execution on a computing infrastructure.

FIG. 5 is a flow diagram of an example method 500 employed by the constructing infrastructure 120 to construct multiple application components 104 of an application for execution on a computing infrastructure, such as the IaaS 130 depicted in FIG. 1, based on the application descriptor 106 illustrated in FIG. 4. In the method 500, a series of operations 504-514 are undertaken to construct each application component 104 indicated in the application descriptor 106 (FIG. 1). While the method 500 of FIG. 5 indicates each application component 104 is handled in a serial fashion, multiple application components 104 may be constructed in parallel in some examples.

For each application component 104 (operation 502), a machine template is determined from the machine template identifier 410 in the application component information 400 (operation 504). The identified machine template may then be used to select or identify computing machine resources from resources 132 through 142 in the IaaS 130 that are available for executing the application component 104 (operation 506). The constructing infrastructure 120 may also determine provisioning instructions via the provisioning instructions identifier 420 (operation 508) and then execute the provisioning instructions to install software resources, such as the software resources 122 of FIG. 1, on the selected computing machine resources (operation 510).

The constructing infrastructure 120 may then configure the various machine and/or software resources associated with the application component 104 for execution. More specifically, the constructing infrastructure 120 may configure the resulting machine or software resources to control the number of instances of the application component 104 created according to the elasticity rules 432 (operation 512). The machine for the application component 104 may also be configured to control the visibility of the associated application component 104 to other application components 104 of the same application based on the visibility rules 434 for the application component 104 (operation 514). Further, the constructing infrastructure 120 may execute load balancer instructions to register the application component 104 with a load balancer to expose the application component 104 to a user (operation 516). Other operations described above in conjunction with the application descriptor 106 shown in FIG. 4 may also be implemented in other embodiments of the method 500.

Figure 6:
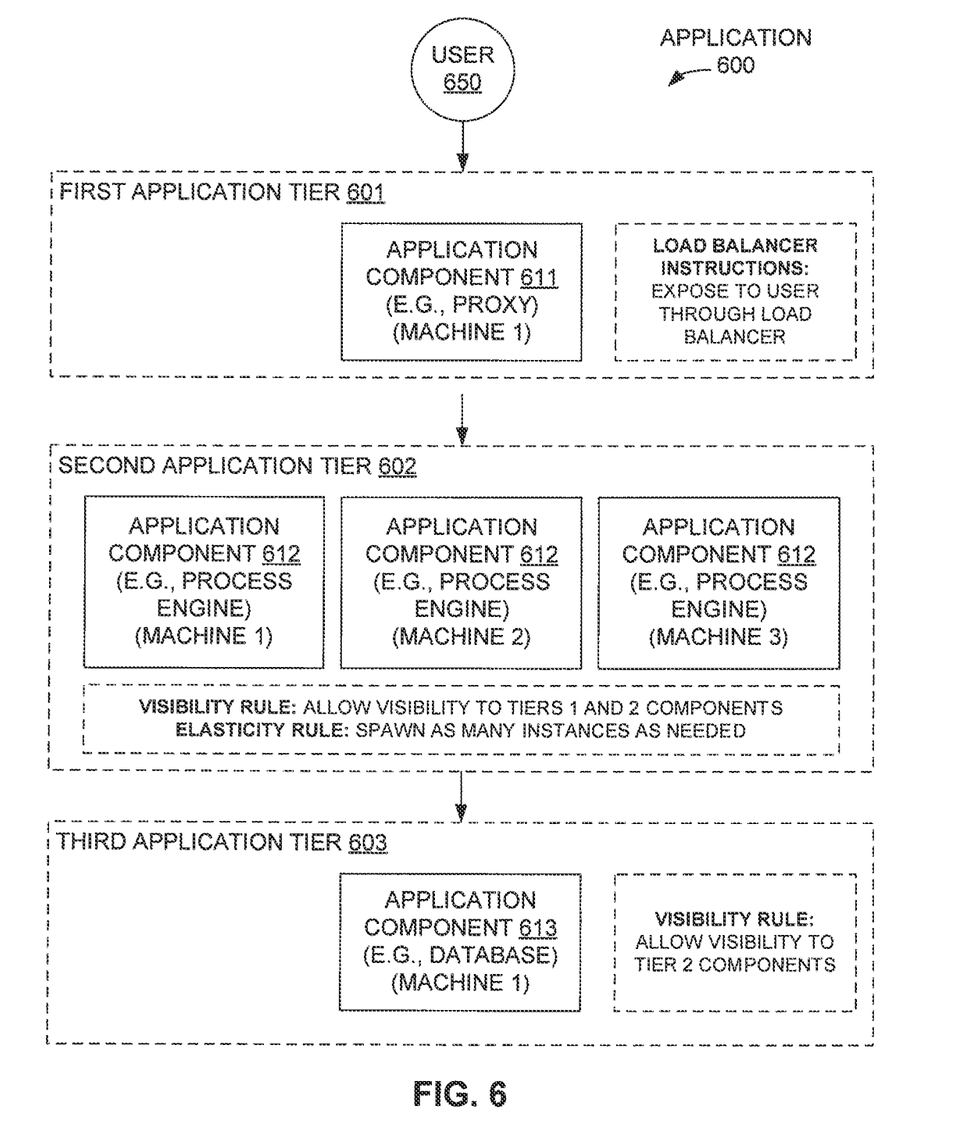
FIG. 6 is a block diagram illustrating an example multitier application including multiple components as constructed for execution on a computing infrastructure.

FIG. 6 is a block diagram illustrating an example multitier application 600 to be accessed by a user 650. The application 600 includes multiple application components 611, 612, and 613 as constructed for execution on a computing infrastructure. As shown and described by way of an application descriptor 106 for the application 600, a first application component 611 is associated with a first application tier 601, a second application component 612 corresponds to a second application tier 602, and a third application component 613 is associated with a third application tier 603, with the first application tier 601 being the highest-level tier of the application 600.

As described above, the relative position of the application components 611-613 within the application 600 hierarchy is determined via the application descriptor 106 (more specifically, the runtime policies 430 of FIG. 4) for the application 600. In the specific example of FIG. 6, the application descriptor 106 provides load balancer instructions 436 for the first application component 611, thus exposing at least one URL or entry point of the first application component 611 to a user via a load balancer 142. As a result of exposing at least a portion of the first application component 611 to a user, the first application component 611 may be viewed as residing in the first application tier 601. In one example, the first application component 611 may serve as a proxy or front-end for the application 600.

The second application component 612, which may be a process engine for the application 600, may be associated with a visibility rule 434 allowing visibility of the second application component 612 to instances of the first application component 611 and other instances of the second application component 612. This visibility rule 434 may be viewed as placing the second application component 612 in its own second application tier 602. In addition, an elasticity rule 432 for the second application component 612 may cause the creation of as many instances or machines for the second application component 612 as necessary to satisfy some predefined response time. In this particular situation, three machines associated with the second application component 612 are created.

The third application component 613, which operates as a database in FIG. 6, is associated with a visibility rule 434 allowing visibility of at least a portion of the third application component 613 to the second application component 612, but not to the first application component 611. By isolating the third application component 613 from the first application component 611, the third application component 613 operates in a third application tier 603 separate from the other tiers 601 and 602. While the application 600 reflects three separate application tiers 601, 602, and 603, fewer or greater numbers of tiers may be specified in a similar fashion via the visibility rules 434 and the load balancer instructions 436 for each application component 104 of an application.

Moreover, while only a few runtime policies 430 are shown in FIG. 6 for each of the application components 611, 612, and 613, other runtime policies 430 may be provided in some examples. In one implementation, each of the first application component 611 and the third application component 613 may have an associated elasticity rule 432 restricting each of these components 611 and 613 to a single machine or instance. In other examples, the lack of such an elasticity rule 432 may be interpreted as a default number of machines for the components 611 and 613 equal to one.

As a result of at least some of the embodiments described above, an application may be executed on a variety of IaaS offerings with varying APIs without modifying the application. More specifically, by defining the various computing machine resources and support software to be employed, along with any relevant runtime policies applicable to the application, an application descriptor containing a number of data structures holding this information may be interpreted by a constructing infrastructure to build the application using associated IaaS. Further, the application descriptor may not require modification if a standardized format for the descriptor is employed. As a result, in return thr generating the application descriptor, a user may gain the ability to execute the associated application on a variety of IaaSes, as well as continue the ability to execute the application on an IaaS with a modified API.

While the above discussion employs Java® applications as examples, applications drafted in other programming languages may benefit from use of the various principles described herein. Furthermore, while various embodiments discussed herein depict a typical client-server environment, peer-to-peer or other cooperative arrangements between a user and a system designed to execute an application may also employ the inventive techniques discussed above.

Figure 7:
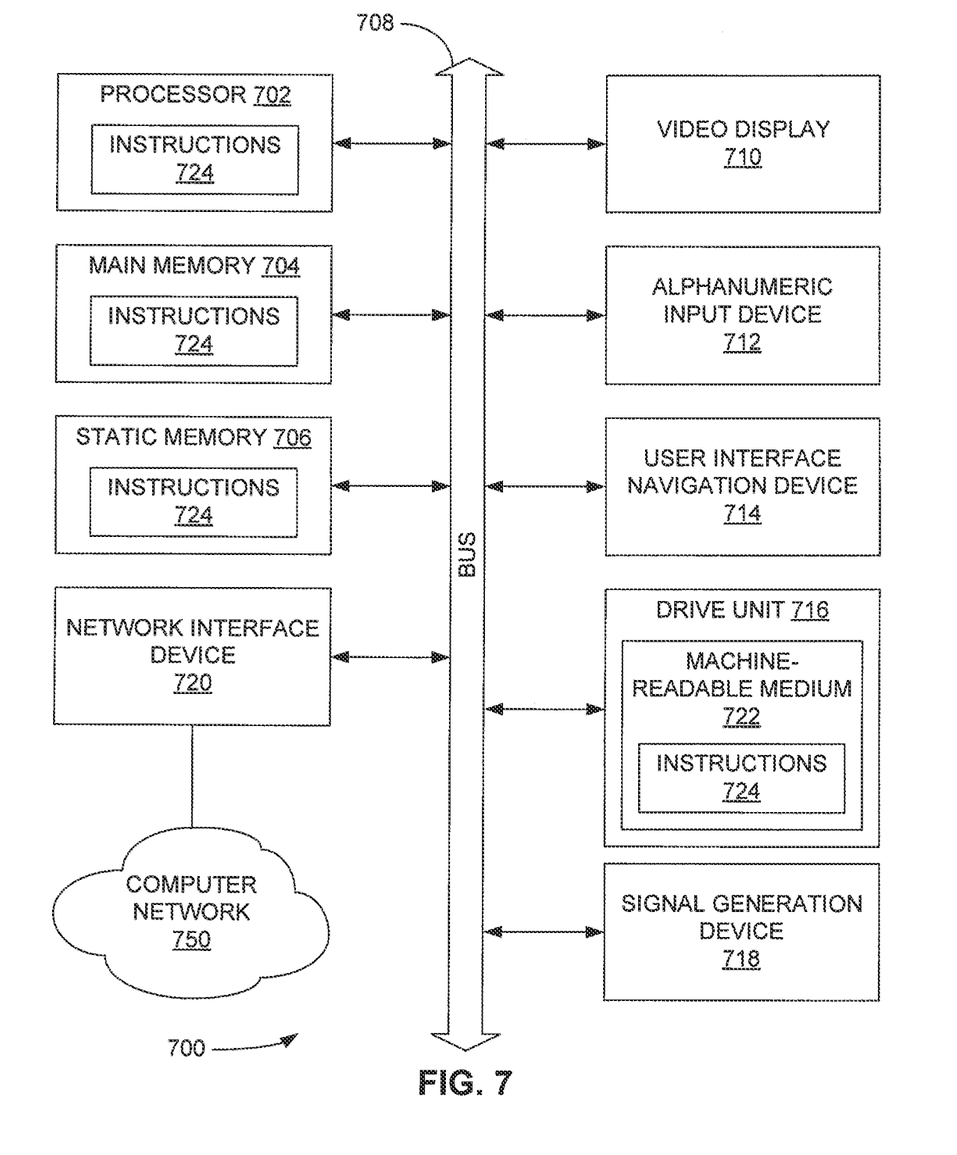
FIG. 7 depicts a block diagram of a machine in the example form of a processing system within which may be executed a set of instructions for causing the machine to perform any one or more of the methodologies discussed herein.

FIG. 7 depicts a block diagram of a machine in the example form of a processing system 700 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 700 includes a processor 702 (e.g., a central processing unit (CPU), a graphics processing unit (GPU), or both), a main memory 704 (e.g., random access memory), and static memory 706 (e.g., static random-access memory), which communicate with each other via bus 708. The processing system 700 may further include video display unit 710 (e.g., a plasma display, a liquid crystal display (LCD), or a cathode ray tube (CRT)). The processing system 700 also includes an alphanumeric input device 712 (e.g., a keyboard), a user interface (UI) navigation device 714 (e.g., a mouse), a disk drive unit 716, a signal generation device 718 (e.g., a speaker), and a network interface device 720.

The disk drive unit 716 (a type of non-volatile memory storage) includes a machine-readable medium 722 on which is stored one or more sets of data structures and instructions 724 (e.g., software) embodying or utilized by any one or more of the methodologies or functions described herein. The data structures and instructions 724 may also reside, completely or at least partially, within the main memory 704, the static memory 706, and/or within the processor 702 during execution thereof by processing system 700, with the main memory 704 and processor 702 also constituting machine-readable, tangible media.

The data structures and instructions 724 may further be transmitted or received over a computer network 750 via network interface device 720 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the processing system 700) or one or more hardware modules of a computer system (e.g., a processor 702 or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (for example, as a special-purpose processor, such as a field-programmable gate array (FPGA) or an application-specific integrated circuit (ASIC)) to perform certain operations. A hardware module may also include programmable logic or circuitry (for example, as encompassed within a general-purpose processor 702 or other programmable processor) that is temporarily configured by software to perform certain operations. It will be appreciated that the decision to implement a hardware module mechanically, in dedicated and permanently configured circuitry, or in temporarily configured circuitry (for example, configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules include a general-purpose processor 702 that is configured using software, the general-purpose processor 702 may be configured as respective different hardware modules at different times, Software may accordingly configure a processor 702, for example, to constitute a particular hardware module at one instance of time and constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions (such as, for example, over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (for example, a collection of information).

The various operations of example methods described herein may be performed, at least partially, by one or more processors 702 that are temporarily configured (e.g., by software) or permanently configured to perform the relevant operations. Whether temporarily or permanently configured, such processors 702 may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors 702 or processor-implemented modules. The performance of certain of the operations may be distributed among the one or more processors 702, not only residing within a single machine but deployed across a number of machines. In some example embodiments, the processors 702 may be located in a single location (e.g., within a home environment, within an office environment, or as a server farm), while in other embodiments, the processors 702 may be distributed across a number of locations.

While the embodiments are described with reference to various implementations and exploitations, it will be understood that these embodiments are illustrative and that the scope of claims provided below is not limited to the embodiments described herein. In general, the techniques described herein may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A processor-implemented method, comprising:
    receiving an application descriptor comprising information regarding each of a plurality of components of an application, wherein:
        each of the plurality of components is associated with one of a plurality of hierarchical tiers of the application,
        the information in the application descriptor comprises runtime policy information governing execution of the application, and
        the runtime policy information comprises rules governing visibility of components of the plurality of components of the application to other components of the plurality of components of the application;
    selecting available computing machine resources for execution of the application based on the information in the application descriptor;
    installing, on the selected computing machine resources, software resources comprising the application based on the information in the application descriptor; and
    configuring at least one of the selected computing machine resources and the installed software resources for the execution of the application based on the runtime policy information.

2. The processor-implemented method of claim 1, the information identifying a machine template defining physical machine resources for execution of the application.

3. The processor-implemented method of claim 2, the machine template defining an operating system for execution of the application.

4. The processor-implemented method of claim 1, the information identifying instructions for provisioning the selected computing machine resources with the software resources.

5. The processor-implemented method of claim 1, the runtime policy information further comprising rules governing instantiation of at least one of the plurality of components of the application.

6. The processor-implemented method of claim 1, the runtime policy information further comprising instructions for load-balancing at least one of the plurality of components of the application.

7. The processor-implemented method of claim 1, wherein each of the components of the application corresponds to one of a plurality of hierarchical tiers of the application based on the rules governing visibility.

8. The processor-implemented method of claim 6, wherein each of the components of the application corresponds to one of a plurality of hierarchical tiers of the application based on the rules governing visibility and based on the instructions for load-balancing.

9. A non-transitory computer-readable storage medium comprising instructions that, when executed by at least one processor of a machine, cause the machine to perform operations comprising:
    receiving an application descriptor comprising information regarding each of a plurality of components of an application, wherein:
        each of the plurality of components is associated with one of a plurality of hierarchical tiers of the application,
        the information in the application descriptor comprises runtime policy information governing execution of the application, and
        the runtime policy information comprises rules governing visibility of components of the plurality of components of the application to other components of the plurality of components of the application;
    selecting available computing machine resources for execution of the application based on the information in the application descriptor;
    installing, on the selected computing machine resources, software resources comprising the application based on the information in the application descriptor; and
    configuring at least one of the selected computing machine resources and the installed software resources for the execution of the application based on the runtime policy information.

10. A system having a processor comprising:
    a plurality of available computing machine resources for execution of an application; and
    an application construction infrastructure configured to:
    receive an application descriptor comprising information regarding each of a plurality of components of the application, each of the plurality of components being associated with one of a plurality of hierarchical tiers of the application; and the information comprising runtime policy information governing execution of the application, and the runtime policy information comprises rules governing visibility of components of the plurality of components of the application to other components of the plurality of components of the application;
    select available ones of the computing machine resources for execution of the application based on the information in the application descriptor;
    install, on the selected computing machine resources, software resources comprising the application based on the information in the application descriptor; and
    configure the at least one of the selected computing machine resources and the installed software resources for the execution of the application based on the runtime policy information.

11. The system of claim 10, the information identifying a machine template defining physical machine resources and an operating system for execution of the application.

12. The system of claim 10, the information identifying instructions for provisioning the selected computing machine resources with the software resources.

13. The system of claim 10, the runtime policy information further comprising rules governing instantiation of at least one of the plurality of components of the application.

14. The system of claim 10, the runtime policy information further comprising instructions for load-balancing at least one of the plurality of components of the application.

* * * * *